United States Patent [19]

Clites

[11] Patent Number: 4,726,548
[45] Date of Patent: Feb. 23, 1988

[54] AIRFOIL SELF ENERGIZING BOUNDARY LAYER CONTROL SYSTEM

[76] Inventor: James L. Clites, 23301 Bocana, Malibu, Calif. 90265

[21] Appl. No.: 889,944

[22] Filed: Jul. 28, 1986

[51] Int. Cl.[4] .............................................. B64C 21/06
[52] U.S. Cl. ..................................... 244/209; 244/204
[58] Field of Search ............... 244/207, 208, 209, 204; 416/22, 90 R, 90 A, 91, 92

[56] References Cited

U.S. PATENT DOCUMENTS

| | | |
|---|---|---|
| Re. 23,105 | 4/1949 | Stalker . |
| 2,04786 | 5/1936 | Stalker . |
| 1,513,241 | 10/1924 | Harding . |
| 1,691,942 | 11/1928 | Stalker . |
| 1,829,616 | 10/1931 | Stalker . |
| 1,836,592 | 12/1931 | Hammond . |
| 1,980139 | 11/1934 | Jones . |
| 1,988,670 | 1/1935 | Stalker . |
| 2,078,854 | 4/1937 | Jones . |
| 2,164,721 | 7/1939 | Price . |
| 2,270,926 | 1/1942 | Backhaus . |
| 2,394,513 | 2/1946 | Chappedelaine ..................... 244/208 |
| 2,406,920 | 9/1946 | Stalker . |
| 2,427,972 | 9/1947 | Melchior . |
| 2,431,592 | 11/1947 | Stalker . |
| 2,639,874 | 5/1953 | Stalker . |
| 2,659,552 | 11/1953 | Stalker . |
| 2,751,168 | 6/1956 | Stalker . |
| 2,833,492 | 5/1958 | Fowler . |
| 2,867,392 | 1/1959 | Lear . |
| 3,100,539 | 8/1963 | Hulbert ............................. 416/91 |
| 3,109,499 | 11/1963 | Klein ................................ 416/91 |
| 3,117,751 | 1/1964 | Rogers et al. . |
| 4,575,030 | 3/1986 | Gratzer . |

FOREIGN PATENT DOCUMENTS 807110 1/1937 France ................................. 416/91

Primary Examiner—Sherman D. Basinger
Assistant Examiner—Rodney Corl
Attorney, Agent, or Firm—William W. Haefliger

[57] ABSTRACT

An elongated airfoil is perforated in such a way as to cause boundary layer air at the airfoil surface to be drawn into the airfoil, and then evacuated.

11 Claims, 6 Drawing Figures

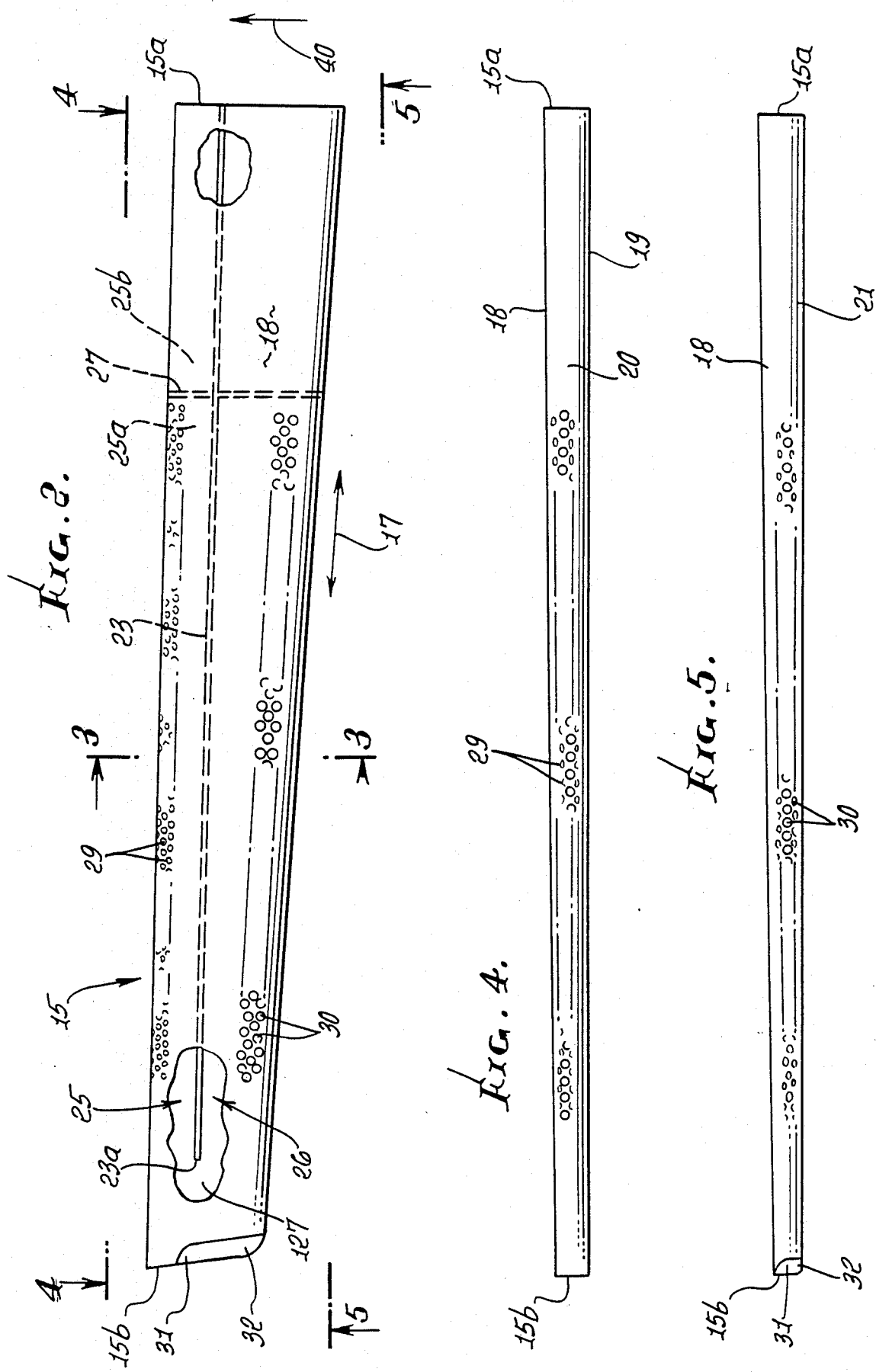

AIRFOIL SELF ENERGIZING BOUNDARY LAYER CONTROL SYSTEM

BACKGROUND OF THE INVENTION

This invention relates generally to improvements in the efficiency of airfoils over which air flows; and more particularly to control of boundary layer air flow over such airfoils.

It is known that airfoils operate more efficiently, as in producing lift, etc., if air flowing over an airfoil closely follows its shape. However, boundary layer air turbulence at the upper side of the airfoil typically prevents such desired flow. In the past, means to reduce such boundary layer air turbulence included pumps or other devices to pump air from the airfoil surface, and major changes in airfoil shape, reducing airfoil efficiency. Pumps and other known devices for this purpose require moving parts subject to wear, or failure and undesirably add greatly to cost and weight. Changes in airfoil shape, in flight greatly complicate airfoil construction.

There is need for improved means to overcome the boundary layer control problem.

SUMMARY OF THE INVENTION

It is a major object of the invention to provide simple, effective means to achieve efficient boundary layer control, and with no moving parts or airfoil shape changes being required.

Basically, the invention is embodied in an airfoil having upper, lower and front walls or skins, and a trailing edge portion, and includes:

(a) first partition means in the airfoil extending generally lengthwise thereof, to form with said walls a front chamber and a rear chamber, (b) second partition means dividing the front chamber into primary and secondary sections spaced generally lengthwise of the airfoil, (c) certain perforations or slots in the front wall associated with one of said sections whereby air is forced into said one section in response to forward travel of the airfoil through the atmosphere, and other perforations or slots in said upper wall adjacent said rear chamber and via which air passing over the airfoil may enter the rear chamber, (d) there being air outlet means in the airfoil via which air in the one section and in such rear chamber discharges, whereby air is drawn from the rear chamber to induce boundary layer air entry into the rear chamber via the other perforations or slots.

As will be seen, the outlet means it typically located proximate an end of the airfoil, and may include outlets from the front and rear chambers located in such proximity that pressurized air leaving the front chamber outlet acts to aspirate air from the rear chamber, which in turn lowers the pressure in the rear chamber, so that boundary layer air on the airfoil will be drawn into the rear chamber via the other perforations, or slots as referred to.

These and other objects and advantages of the invention, as well as the details of an illustrtive embodiment, will be more fully understood from the following specification and drawings, in which:

DRAWING DESCRIPTION

FIG. 2 is an enlarged top plan view of an airfoil as used on an aircraft;

FIG. 4 is a front elevation of the FIG. 2 airfoil;

FIG. 5 is a rear elevation of the FIG. 2 airfoil; and

DETAILED DESCRIPTION

Figure 1:
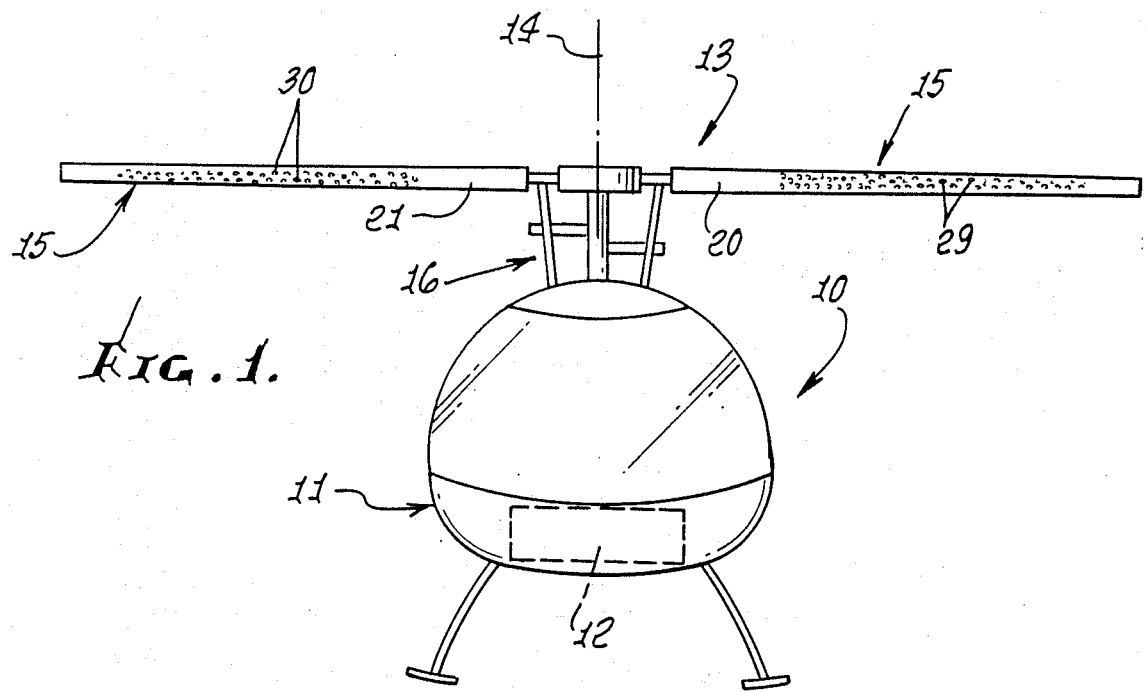
FIG. 1 is a frontal view of an aircraft.

FIG. 1 shows one form of aircraft on which the invention is usable. It depicts a helicopter 10 having a body 11, and engine 12 driving a rotor 13 to rotate about a vertical axis 14. Rotor blades 15 are rotated about that axis and their attitude is conventionally controlled as by swash plate, guide plate and rod mechanisms all of which are indicated generally at 16. The invention is also applicable to fixed wing aircraft, and to other mechanisms where airfoils are traveled through the air or other gases.

Figure 3:
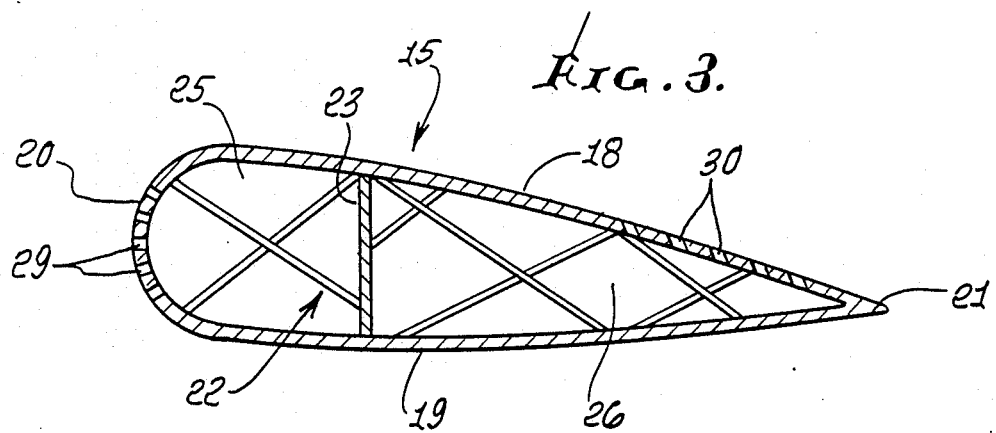
FIG. 3 is an enlarged section on lines 3—3 of FIG. 2.
Figure 6:
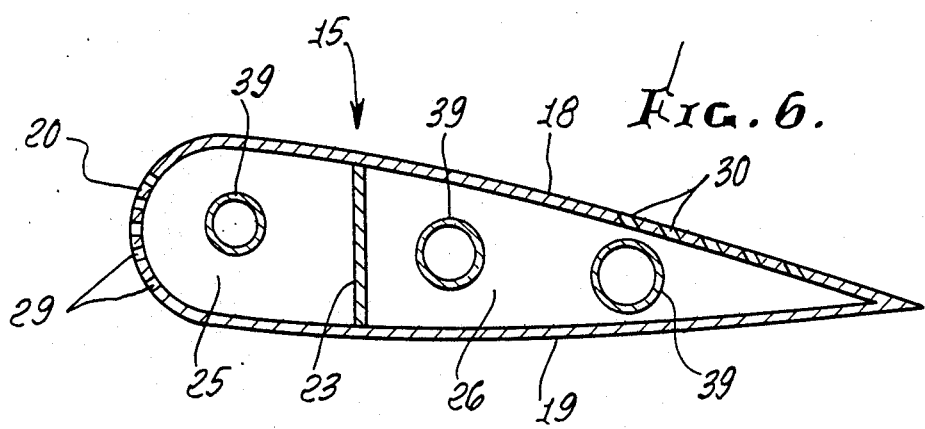
FIG. 6 is a modified section like that of FIG. 3.

The blade 15 shown in FIG. 2 is representative of a class of such blades as used on aircraft and other mechanisms as described. It has airfoil shape, longitudinally elongated in direction 17. The airfoil has an upper wall or skin 18; lower wall or skin 19, a forwardly convex front wall 20, and a trailing edge portion 21 formed by convergence of walls 18 and 19. Merely as illustrative, FIG. 3 shows reinforcement structure 22 within the interior of the airfoil, and it may take many different forms.

In accordance with the invention, first partition means extends within the airfoil generally lengthwise thereof, and one example of such partition means is indicated at 23. It is joined to the upper and lower walls 18 and 19 and forms therewith a front chamber 25 and a rear chamber 26, these two being isolated from one another except at plenum region 127 outwardly of the terminal 23a of partition 23. Terminal 23a is typically spaced about 10 to 20% of the length of the wing from the wing outer end, for best results. A second partition means, such as partition 27 extends from front wall 20 rearwardly to partition 23 to divide the front chamber 25 into the sections indicated at 25a and 25b. Partition 27 is located lengthwise of the airfoil, closer to inbound end 15a of the airfoil than to its outbound end 15b; and in FIG. 2, the partition 27 is located at a point about ¼ of the airfoil length, as measured from end 15a.

Certain perforations or slots 29 are located in the front wall associated with one of the sections, as for example section 25a whereby air is forced, i.e. forcibly injected into the one section 25a of the forward chamber in response to forward travel of the airfoil through the atmosphere, i.e. in direction 40; and other perforations or slots 30 are located in the upper wall 18 adjacent the rear chamber, and over which boundary layer air passing over the airfoil may enter the rear chamber.

Air outlet means is also provided in the airfoil, via which air in the chamber section 25a, and chamber 26, may discharge; and the arrangement is such that higher pressure air in chamber 26a flows outwardly to educt or aspirate air from the second chamber, thereby to induce air to enter the second chamber via perforations or slots 30, efficiently removing boundray layer air from over the airfoil. See for example air outlet opening 31 from plenum chamber 127, at the outer tip of the airfoil. Opening 31 is formed by leaving the outer end of the wing open. Air leaving opening 31 flows rearwardly, evacuating the plenum chamber wherein aspiration occurs, whereby air is drawn outwardly from the chamber 26 and through the inlet openings 30, no moving parts being required to achieve this boundary layer removal. Notch 32 cut in the upper skin is used to assist in the evacuation of the plenum chamber 127. Centrifugal force, in the case of a rotating rotor, also tends to carry the air in the chambers 25a and 26 toward the outlets.

Note in FIGS. 2–5 that the perforations or slots 29 are distributed generally along length $P_1$ of the airfoil; and the other perforations or slots 30 are distributed generally along length $P_2$ of the airfoil, where:

$$P_2 \approx P_1$$

So as not to waste interior space in the airfoil, which may be utilized for fuel storage or other purposes, tubes 39 aspirate air through the storage compartment.

I claim:

1. In an elongated airfoil having an upper wall, a lower wall, a forwardly presented and convex front wall, and a trailing edge portion, the combination comprising
   (a) first partition means in the airfoil extending generally lengthwise thereof, to form with said walls a front chamber and a rear chamber,
   (b) the front chamber including a section spaced generally lengthwise of the airfoil,
   (c) certain perforations or slots at and in the forwardly presented front wall associated with said section whereby air is forced into said section to flow therein lengthwise of the airfoil in response to forward travel of the airfoil through the atmosphere, and other perforations in said upper wall adjacent said rear chamber and via which air passing over the airfoil may enter the rear chamber,
   (d) there being air outlet means in the airfoil via which air in said section and in such rear chamber discharges, whereby air is drawn from said rear chamber to induce boundary layer air entry into the rear chamber via said other perforations,
   (e) and including isolated storge means in at least one of said chambers.

2. The combination of claim 1 wherein said outlet means is located proximate an end of the airfoil.

3. The combination of claim 2 including means acting to rotate the airfoil about an axis, said end of the airfoil being the outermost end of the airfoil relative to said axis.

4. The combination of claim 2 wherein said outlet means includes outlets from the front and rear chambers located in such proximity that air leaving the front chamber aspirates air from the rear chamber.

5. The combination of claim 4 wherein said outlet means includes notching in the upper wall of said airfoil.

6. The combination of claim 1 wherein said certain perforations or slots are distributed along length $P_1$ of the airfoil, and said other perforations are distributed along length $P_2$ of the airfoil, and wherein $P_2 \approx P_1$.

7. The combination of claim 1 wherein the airfoil has an outer end, said front wall is forwardly convex, and said certain perforations or slots are located in the convexity of the front wall, directly forwardly of said section.

8. The combination of claim 1 wherein said other perforations are distributed along the major length of the airfoil, above the rear chamber.

9. The combination of claim 1 wherein the first partition means has a terminal spaced from the outermost end of the airfoil, whereby a plenum chamber is provided to intercommunicate the front chamber with the rear chamber, the outlet means located in outwardly spaced relation to the first partition means terminal.

10. The combination of claim 9 wherein said terminal is spaced between about 10% to 20% of the airfoil length, from the outermost end of the airfoil.

11. The combination of claim 10 wherein a notch is formed in the airfoil upper surface, at the outer end of the airfoil.

* * * * *